(12) United States Patent
Tsuji et al.

(10) Patent No.: US 8,970,884 B2
(45) Date of Patent: Mar. 3, 2015

(54) IMAGE FORMING APPARATUS

(71) Applicant: KYOCERA Document Solutions Inc., Osaka (JP)

(72) Inventors: Syuntaro Tsuji, Osaka (JP); Kenichiro Nitta, Osaka (JP)

(73) Assignee: Kyocera Document Solutions Inc. (JP)

( * ) Notice: Subject to any disclaimer, the term of this patent is extended or adjusted under 35 U.S.C. 154(b) by 274 days.

(21) Appl. No.: 13/711,379

(22) Filed: Dec. 11, 2012

(65) Prior Publication Data
US 2013/0163040 A1    Jun. 27, 2013

(30) Foreign Application Priority Data

Dec. 27, 2011 (JP) ................................. 2011-285146
Dec. 27, 2011 (JP) ................................. 2011-285147
Jun. 28, 2012 (JP) ................................. 2012-145815

(51) Int. Cl.
G06F 3/12    (2006.01)
G06K 15/00   (2006.01)
G06F 13/00   (2006.01)
G06F 3/06    (2006.01)
H04N 1/00    (2006.01)

(52) U.S. Cl.
CPC .......... *G06F 3/0626* (2013.01); *H04N 1/00941* (2013.01)
USPC ........ 358/1.15; 358/1.13; 358/1.16; 713/164; 719/319

(58) Field of Classification Search
None
See application file for complete search history.

(56) References Cited

U.S. PATENT DOCUMENTS

2006/0090112 A1* 4/2006 Cochran et al. ............... 714/737
2006/0184942 A1* 8/2006 Cox ............................. 718/100
2012/0054877 A1* 3/2012 Rosu ............................ 726/30

FOREIGN PATENT DOCUMENTS

JP    2008-204242    9/2008

* cited by examiner

*Primary Examiner* — Thomas Lett

(57) ABSTRACT

An image forming apparatus of the present disclosure includes a first processing unit; a second processing unit configured to perform a process different from a process performed by the first processing unit; and a non volatile memory device in which a shared root file system has been stored, the shared root file system mounted by a kernel for the first processing unit and a kernel for the second processing unit.

18 Claims, 8 Drawing Sheets

IMAGE FORMING APPARATUS

CROSS-REFERENCE TO RELATED APPLICATIONS

This application relates to and claims priority rights from Japanese Patent Applications: No. 2011-285146, filed on Dec. 27, 2011, No. 2011-285147, filed on Dec. 27, 2011, and No. 2012-145815, filed on Jun. 28, 2012, the entire disclosures of which are hereby incorporated by reference herein.

BACKGROUND OF THE INVENTION

1. Field of the Invention

The present invention relates to image forming apparatuses.

2. Description of the Related Art

An image forming apparatus includes a main system and a panel system which controls an operation panel. The main system and the panel system perform different processes, respectively, and are connected to each other by communication interfaces and so forth.

In systems independent of each other like those of the aforementioned image forming apparatus, in general, the systems start respective kernels of operating systems, and mount respective file systems. FIG. 8 shows a flowchart which explains a starting process of an image forming apparatus.

As shown in FIG. 8, for Processors #1 and #2 of two systems, respective kernels and root file systems have been stored in a flash memory. The root file system for Processor #1 includes data and/or a program to be used by Processor #1, and the root file system for Processor #2 includes data and/or a program to be used by Processor #2.

In the starting process of the image forming apparatus, for Processors #1 and #2, respective kernels are loaded and started (Steps S101 and S111). The kernels of Processors #1 and #2 mount root file systems, respectively (Steps S102 and S112).

In the case that plural systems are used as mentioned above, for the systems, it is required that respective kernels and respective root file systems has been stored in a flash memory, and therefore, a large memory area is required to the flash memory.

SUMMARY OF THE INVENTION

An image forming apparatus according to an aspect of the present disclosure includes a first processing unit; a second processing unit configured to perform a process different from a process performed by the first processing unit; and a non volatile memory device in which a shared root file system has been stored, the shared root file system mounted by a kernel for the first processing unit and a kernel for the second processing unit.

Therefore, since one root file system is shared, the size of a memory area required to the non volatile memory device is small.

These and other objects, features and advantages of the present invention will become more apparent upon reading of the following detailed description along with the accompanied drawings.

DETAILED DESCRIPTION

Hereinafter, embodiments according to aspects of the present disclosure will be explained with reference to drawings.

Embodiment 1

Figure 1:
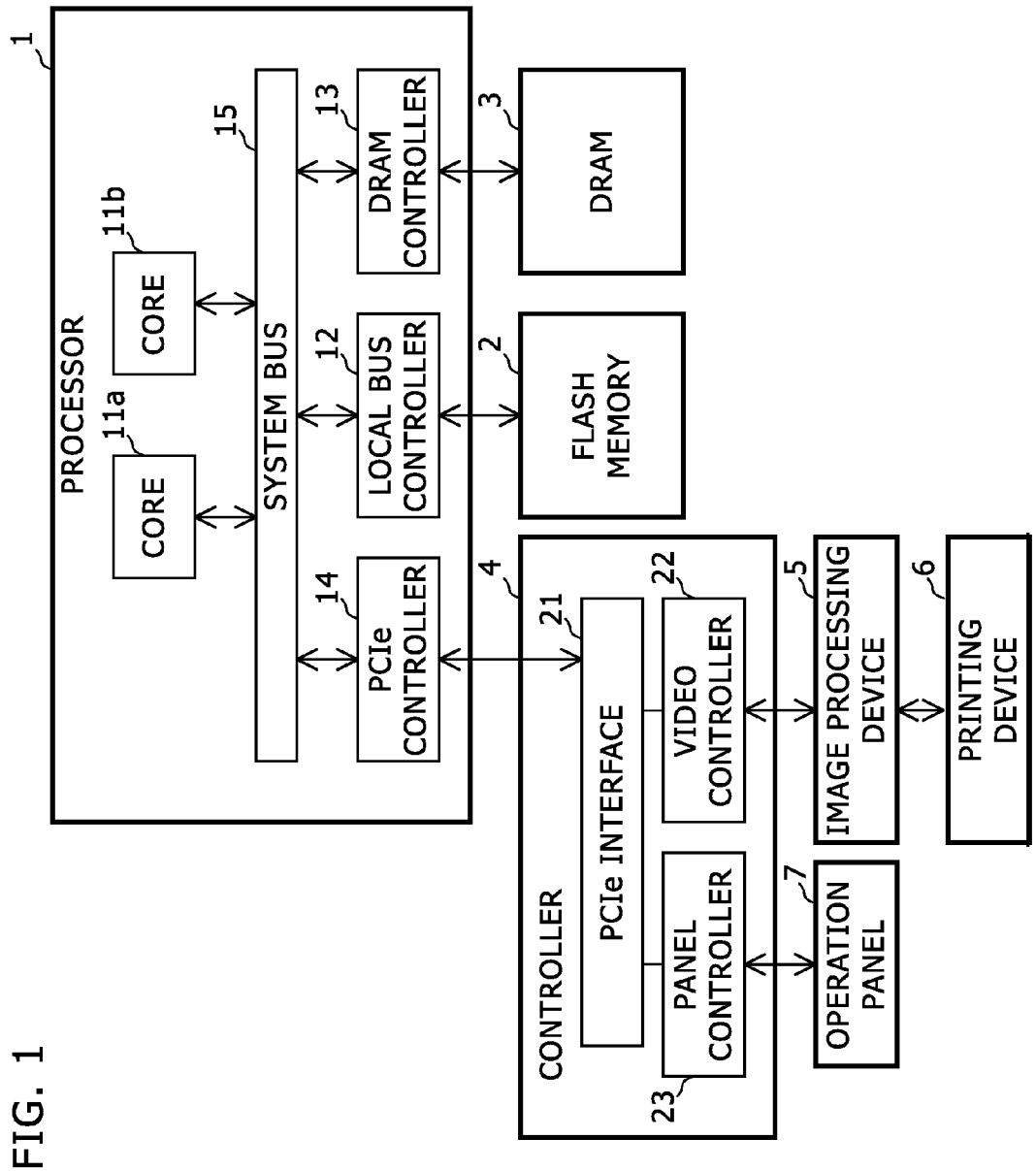
FIG. 1 shows a block diagram which indicates a configuration of an image forming apparatus according to Embodiment 1 of the present disclose.

FIG. 1 shows a block diagram which indicates a configuration of an image forming apparatus according to Embodiment 1 of the present disclose. The present image forming apparatus includes a processor 1, a flash memory 2, a DRAM (Dynamic Random Access Memory) 3, a controller 4, an image processing device 5, a printing device 6, and an operation panel 7.

The processor 1 is a multiple core processor, and includes plural cores 11a and 11b, a local bus controller 12, a DRAM controller 13, and a PCIe controller 14.

The plural cores 11a and 11b are respective processing units which have the same circuit configuration, and execute programs in the flash memory 2 and programs loaded to the DRAM 3.

Further, in Embodiment 1, the core 11a performs a boot loader to start a kernel of the core 11a and a kernel of the core 11b. For instance, a same version of Linux (trademark) is used as these kernels.

The core 11b performs a job management process, and the core 11a performs a predetermined process other than the job management process. In Embodiment 1, the core 11a is used for a panel system to control the operation panel 7, and the core 11b is used for a main system to perform job management and so forth.

The local bus controller 12 performs data communication with the flash memory 2 and so forth connected to a local bus.

The DRAM controller 13 performs data read and data write of the DRAM 3.

The PCIe controller 14 performs data communication with the controller 4 using a PCIe (Peripheral Component Interconnect Express) interface.

The system bus 15 is a data communication path which mutually connects the cores 11a and 11b and the controllers 12 to 14.

Further, the flash memory 2 is a non volatile memory device in which data and/or a program to be used by the plural cores 11a and 11b have been stored. For instance, the flash memory 2 is a NAND type flash memory.

Figure 2:
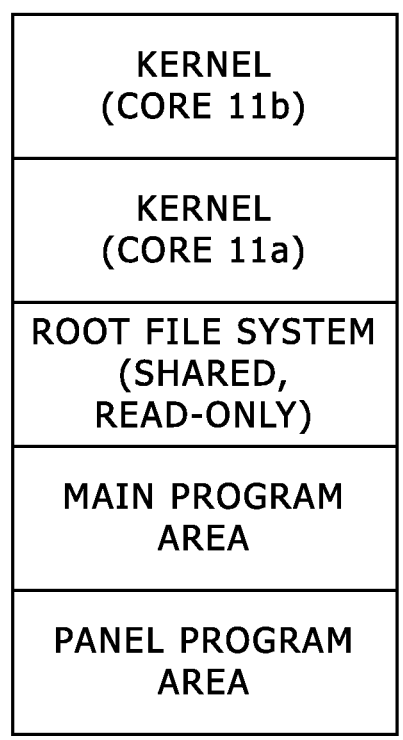
FIG. 2 shows a diagram which indicates an example of memory areas of the flash memory shown in FIG. 1.

FIG. 2 shows a diagram which indicates an example of memory areas of the flash memory 2 shown in FIG. 1.

In the flash memory 2, a program of a kernel (i.e. an operating system) for the core 11a and a program of a kernel (i.e. an operating system) for the core 11b have been stored.

Further, in the flash memory 2, a shared root file system to be mounted both by the kernel of the core 11a and by the kernel of the core 11b has been stored.

This root file system includes a binary program, a standard library, a script, and so forth. This root file system does not include any data and/or any programs to be rewritten by the cores 11a and 11b. In other words, this root file system includes only read-only data and/or a read-only program. Therefore, this root file system is a read-only file system such as cramfs or squashfs. Consequently, a write access to the root file system is prohibited, and a content of the root file system is protected.

Further, the flash memory 2 includes (a) a panel program area in which data and/or a program to be rewritten by the core 11a have been stored and (b) a main program area in which data and/or a program to be rewritten by the core 11b have been stored. The panel program area is mounted by the kernel of the core 11a, and the main program area is mounted by the kernel of the core 11b.

Figure 3:
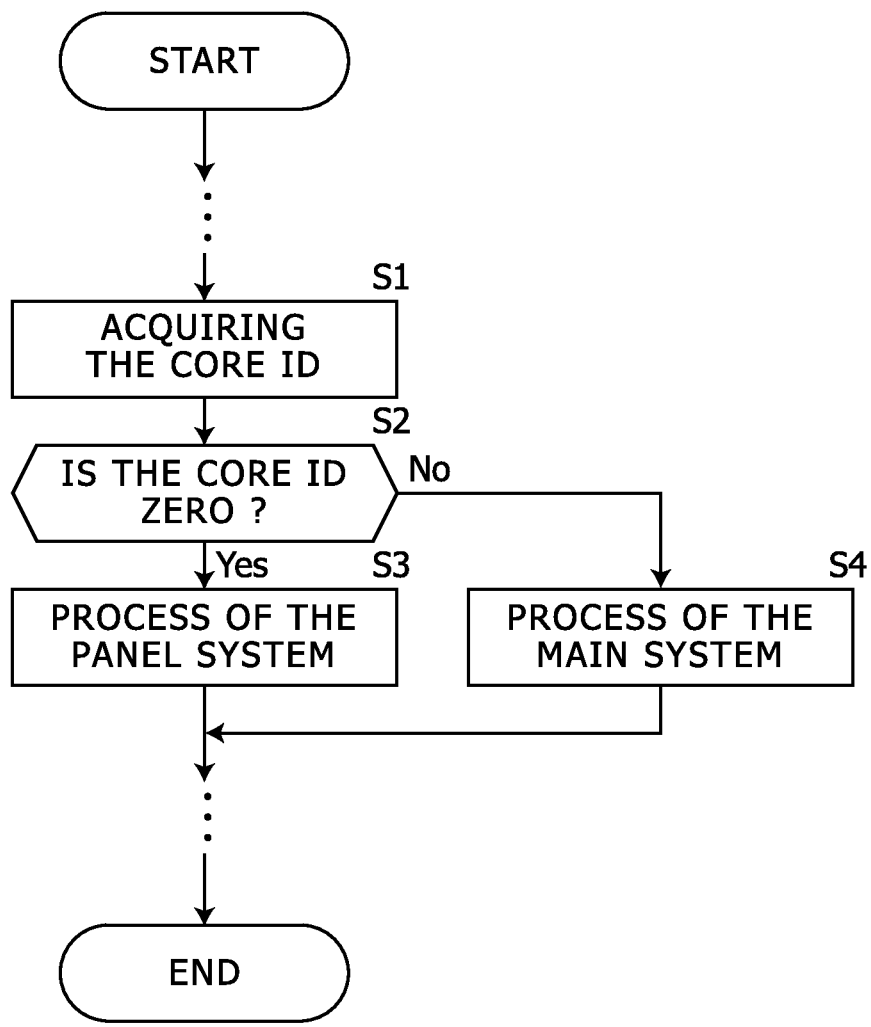
FIG. 3 shows a flowchart that indicates processes performed with a part of a program which is included in a root file system shown in FIG. 2 and is to perform different processes from each other in a panel system and a main system.

FIG. 3 shows a flowchart that indicates processes performed with a part of a program which is included in the root file system shown in FIG. 2 and is to perform different processes from each other in a panel system and a main system. Such program is described to acquire an ID of a processing unit that is executing this program, and to perform a process corresponding to the acquired ID. Therefore, different processes can be performed in the respective systems.

In Embodiment 1, when the core ID of the core 11a is zero, and the core ID of the core 11b is 1, the core ID of a processing unit which is executing this program is acquired (Step S1), and it is determined whether the acquired core ID is zero or not (Step S2); if the acquired core ID is zero then a process for the panel system is performed (Step S3), and if the acquired core ID is 1 then a process for the main system is performed (Step S4).

Further, the DRAM 3 is a volatile memory to which data and/or a program are loaded to be used by the cores 11a and 11b. The DRAM 3 can perform data read and data write faster than those of the flash memory 2.

The controller 4 is a circuit which controls peripheral devices of the processor 1 such as the image processing device 5 and the operation panel 7. The controller 4 includes a PCIe interface 21, a video controller 22, and a panel controller 23. The PCIe interface 21 performs data communication with the PCIe controller 14 of the processor 1. The video controller 22 performs printing by controlling the image processing device 5 and the printing device 6. The panel controller 23 controls the operation panel 7 to display information based on data supplied from the processor 1 and to supply information of a user operation to the operation panel 7. Therefore, in the panel system, the core 11a controls the operation panel 7 using the panel controller 23; and in the main system, the core 11b controls the image processing device 5 and the printing device 6 using the video controller 22.

The image processing device 5 generates print image data to be supplied to the printing device 6 from image data generated by an unshown image scanning device, image data supplied from an unshown host device, and so forth. The printing device 6 prints an image based on the print image data generated by the image processing device 5, for example, in a manner of an electrophotography.

The operation panel 7 is disposed a surface of a housing of this image forming apparatus, and includes a display device which displays information to a user and an input device which detects a user operation. For example, the display device is a liquid crystal display, an indicator and so forth, and the input device is a touch panel, a button switch and so forth.

Figure 4:
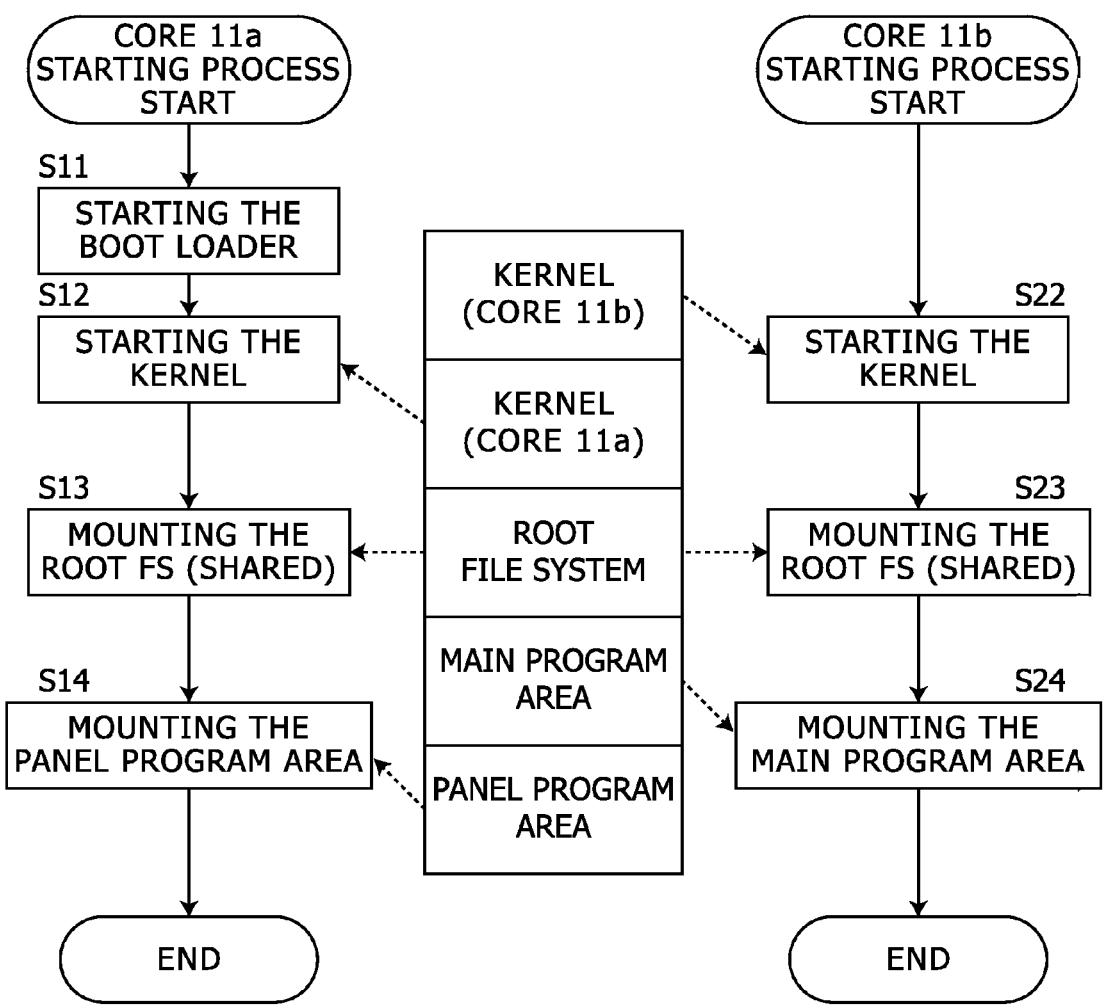
FIG. 4 shows a flowchart that explains a behavior of the image forming apparatus in a starting process in Embodiment 1.

In the following part, a behavior of the image forming apparatus in a starting process in Embodiment 1 is explained. FIG. 4 shows a flowchart that explains a behavior of the image forming apparatus in a starting process in Embodiment 1.

At first, the core 11a starts an unshown boot loader stored in a predetermined memory area, for example, in the flash memory 2 (Step S11).

The core 11a starts the kernel of the core 11a and the kernel of the core 11b using the boot loader (Steps S12 and S22).

Consequently, the cores 11a and 11b operate in accordance with the respective kernels.

The core 11a mounts the root file system in accordance with the kernel (Step S13). Afterward, the core 11a mounts a panel program area to a predetermined lower directory such as /usr/local in accordance with the kernel (Step S14).

On the other hand, the core 11b mounts the root file system in accordance with the kernel (Step S23). Afterward, the core 11b mounts a main program area to a predetermined lower directory such as /usr/local in accordance with the kernel (Step S24).

In the aforementioned manner, the root file system in the flash memory 2 is accessed (read only) by both the cores 11a and 11b; the panel program area in the flash memory 2 is accessed (read and write) by only the core 11a among the cores 11a and 11b; and the main program area in the flash memory 2 is accessed (read and write) by only the core 11b among the cores 11a and 11b.

In the aforementioned Embodiment 1, the image forming apparatus includes (a) the processor 1 including the plural cores 11a and 11b, and (b) the flash memory 2 in which the shared file system to be mounted by both the kernel of the core 11a and the kernel of the core 11b has been stored.

Therefore, since one root file system is shared, the size of a memory area required to the flash memory 2 is small.

Embodiment 2

The image forming apparatus in Embodiment 2 of this disclosure includes a hardware configuration similar to that of the image forming apparatus in Embodiment 1. In Embodiment 2, the core 11a loads the root file system to the DRAM 3, and mounts the root file system loaded to the DRAM 3; and the core 11b does not load the root file system to the DRAM 3, and mounts the root file system loaded by the core 11a to the DRAM 3.

Figure 5:
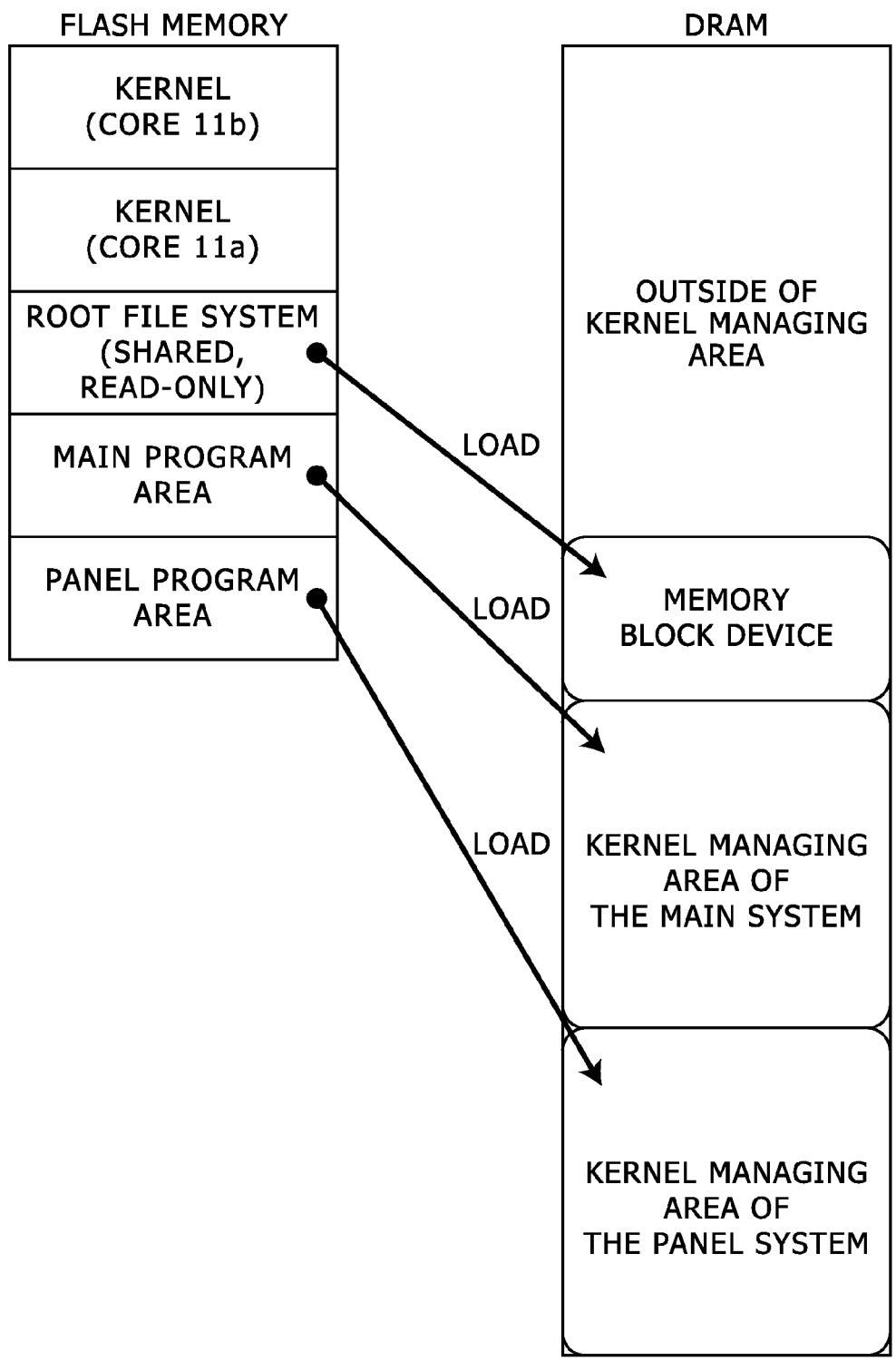
FIG. 5 shows a diagram which indicates an example of memory areas allocated in a DRAM in Embodiment 2.

FIG. 5 shows a diagram which indicates an example of memory areas allocated in the DRAM 3 in Embodiment 2.

As shown in FIG. 5, in Embodiment 2, the root file system is loaded to an outside area of areas managed by the kernel of the core 11a and the kernel of the core 11b in the DRAM 3; and the kernels of the cores 11a and 11b manage the memory area where the root file system was loaded as a memory block device. This memory block device is, for example, an MTD (Memory Technology Device) device.

Specifically, the core 11a loads the root file system to an outside area of areas managed by the kernels of the cores 11a and 11b in the DRAM 3 using a boot loader, and then starts the kernel of the core 11a and the kernel of the core 11b.

Figure 6:
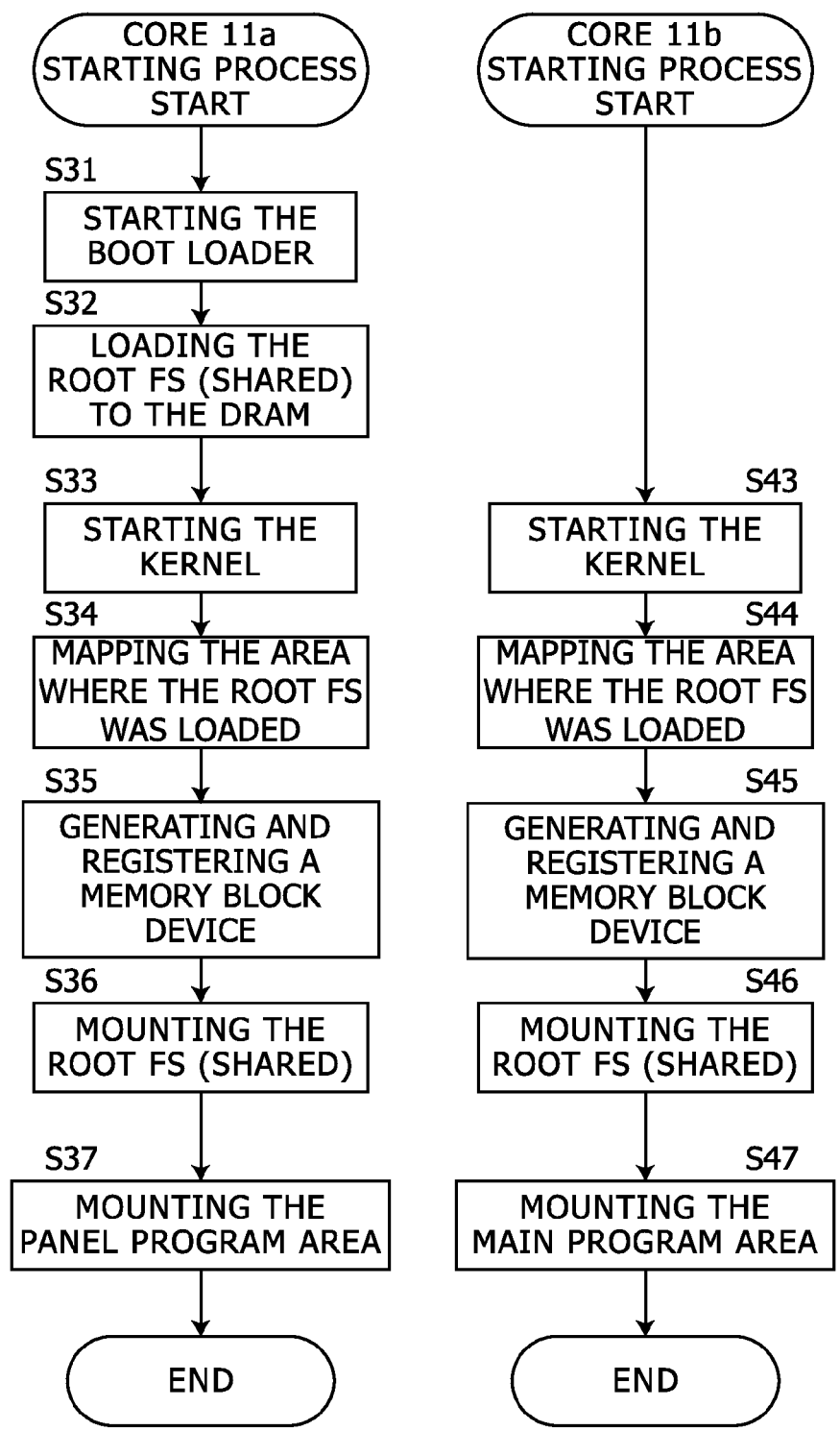
FIG. 6 shows a flowchart that explains a behavior of the image forming apparatus in a starting process in Embodiment 2.

In the following part, a behavior of the image forming apparatus in a starting process in Embodiment 2 is explained. FIG. 6 shows a flowchart that explains a behavior of the image forming apparatus in a starting process in Embodiment 2.

At first, the core 11*a* starts an unshown boot loader stored in a predetermined memory area, for example, in the flash memory 2 (Step S31). For instance, u-boot is used as this boot loader.

The core 11*a* loads the root file system from the flash memory 2 to a predetermined physical address area in the DRAM 3 in accordance with the boot loader (Step S32).

The core 11*a* starts the kernel of the core 11*a* and the kernel of the core 11*b* in accordance with the boot loader (Steps S33 and S43).

Consequently, the cores 11*a* and 11*b* operates in accordance with the respective kernels.

The core 11*a* performs mapping the physical address area where the root file system was loaded to a logical address area, for example, using io_remap function in accordance with the kernel (Step S34), and generates and registers a memory block device (here, an MTD device) of this area (Step S35). The core 11*a* mounts the memory block device (i.e. the root file system) in accordance with the kernel (Step S36). Afterward, the core 11*a* mounts the panel program area to a predetermined lower directory such as /usr/local in accordance with the kernel (Step S37).

On the other hand, the core 11*b* performs mapping the physical address area where the root file system was loaded to a logical address area, for example, using io_remap function in accordance with the kernel (Step S44), and generates and registers a memory block device (here, an MTD device) of this area (Step S45). The core 11*b* mounts the memory block device (i.e. the root file system) in accordance with the kernel (Step S46). Afterward, the core 11*b* mounts the main program area to a predetermined lower directory such as /usr/local in accordance with the kernel (Step S47).

Information on the position of the physical address area where the root file system was loaded (e.g. the top address and the size) is provided to the kernels of the cores 11*a* and 11*b* from the boot loader when the boot loader starts the kernels. For instance, such information is provided as a command line parameter of u-boot.

In the aforementioned manner, the root file system loaded in the DRAM 3 is accessed by both the cores 11*a* and 11*b*; the panel program area in the flash memory 2 is accessed by only the core 11*a* among the cores 11*a* and 11*b*; and the main program area in the flash memory 2 is accessed by only the core 11*b* among the cores 11*a* and 11*b*.

Other parts in the configuration of the image forming apparatus in Embodiment 2 is identical to those in Embodiment 1, and therefore, not explained here.

In the aforementioned Embodiment 2, the core 11*a* loads the root file system to the DRAM 3, and mounts the root file system loaded in the DRAM 3. Contrary to this, the core 11*b* mounts the root file system loaded by the core 11*a* in the DRAM 3.

Therefore, since one root file system is shared, the size of a memory area required to the flash memory 2 is small. Further, since the root file system loaded in the DRAM 3 is used, data read and data write to the root file system in the DRAM 3 can be performed faster than those in the flash memory 2. Furthermore, in Embodiment 2, since this root file system includes only read-only data and/or a read-only program, the root file system is never changed. Therefore, after finishing using the root file system loaded in the DRAM 3, it is not necessary to write the root file system from the DRAM 3 back to the flash memory 2.

The description of the present invention has been presented for purposes of illustration and description, and is not intended to be exhaustive or limited to the invention in the form disclosed.

For example, in Embodiments 1 and 2, the plural processing units are formed by the plural cores 11*a* and 11*b* included in the processor 1. Alternatively, the plural processing units may be formed by plural processors connected via a bus or the like.

Further, in Embodiments 1 and 2, the core 11*a* is used for the panel system. Alternatively, the image forming apparatus may includes a network interface, and the core 11*a* may perform a communication process using this network interface.

Figure 7:
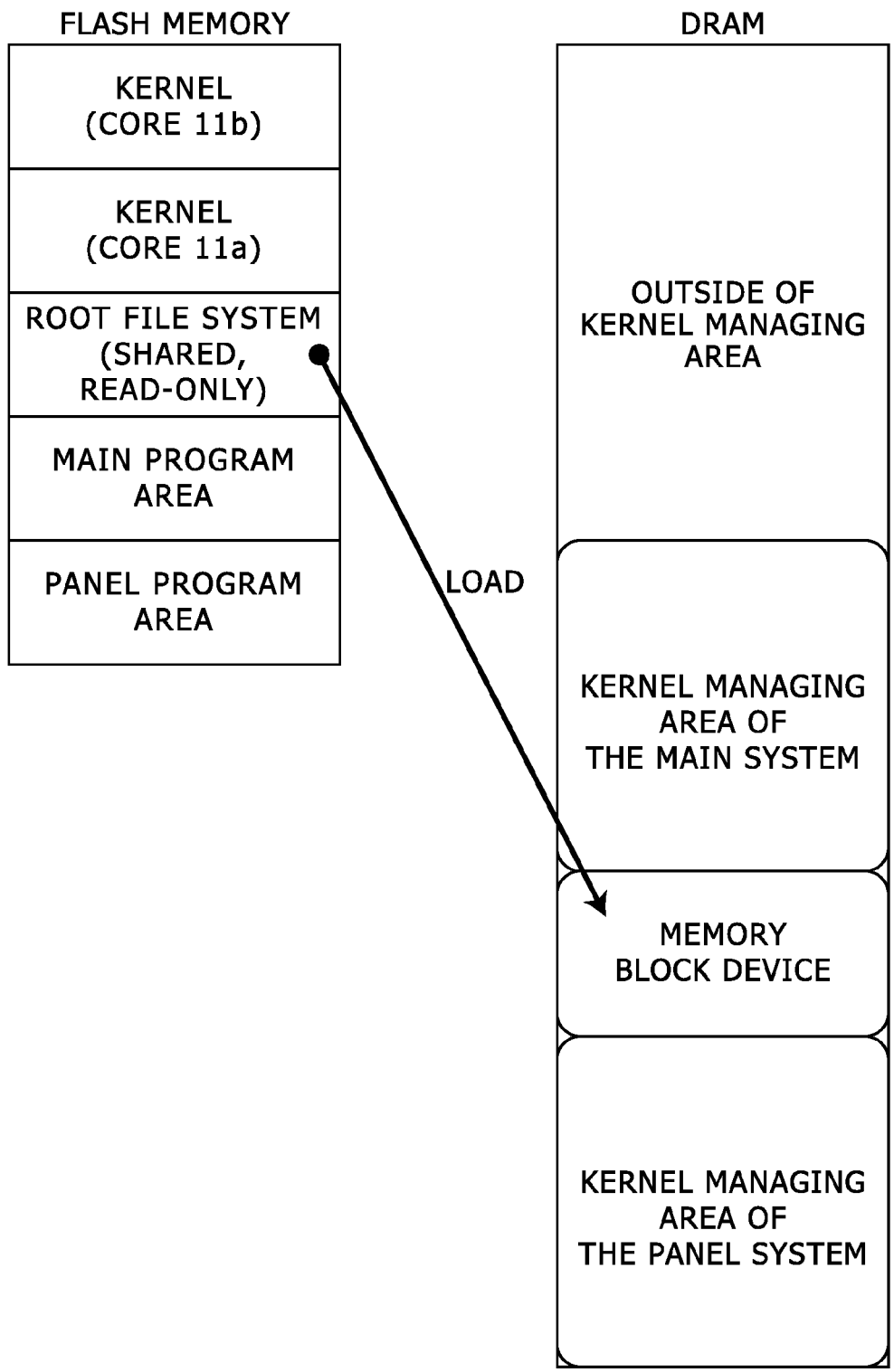
FIG. 7 shows a diagram which indicates another example of memory areas allocated in a DRAM in Embodiment 2.
Figure 8:
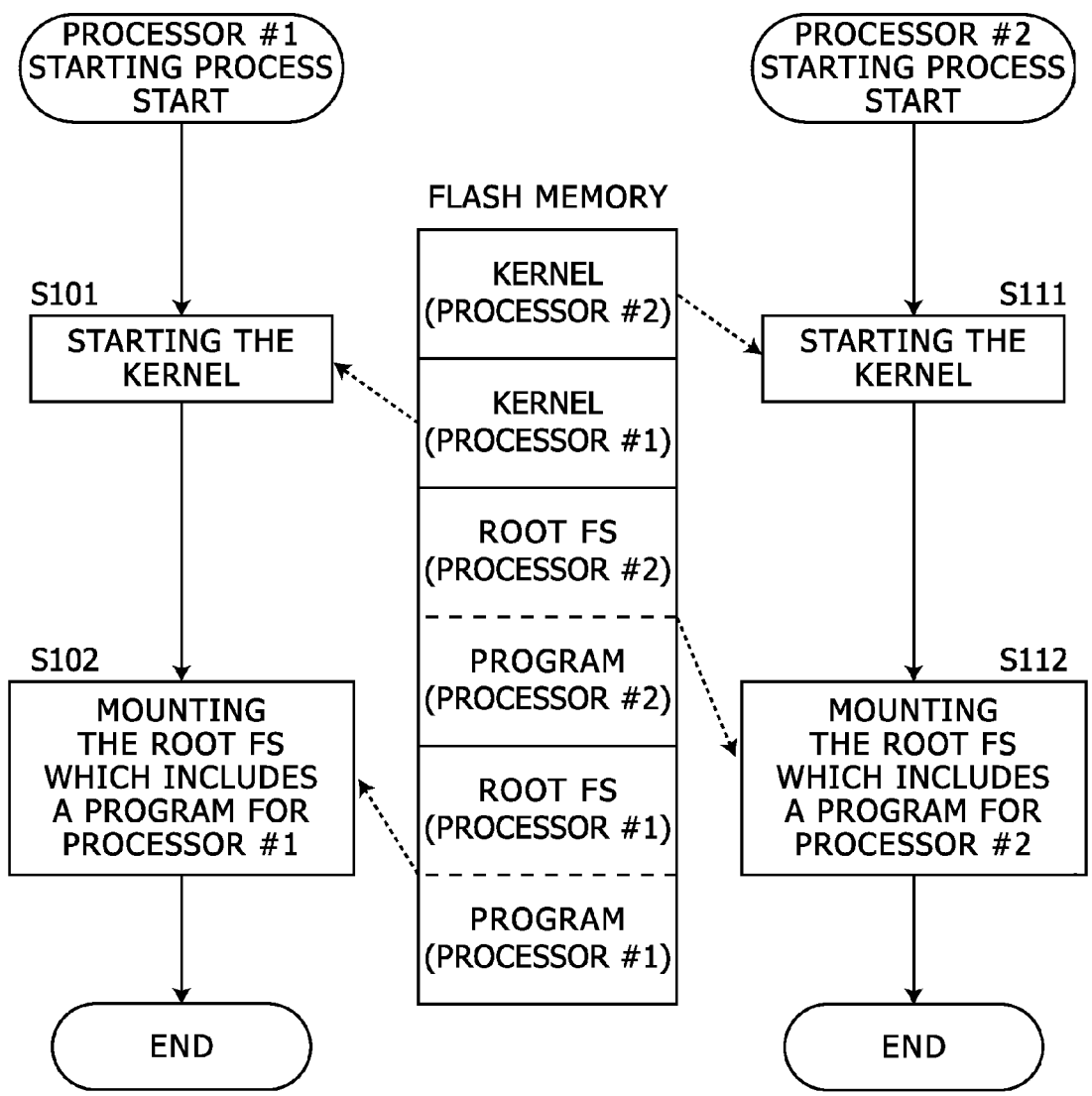
FIG. 8 shows a flowchart that explains a behavior of an image forming apparatus in a starting process.

Furthermore, in Embodiments 1 and 2, the memory block device of the root file system may be enabled to be in an address area after the area managed by the kernel of the core 11*a* and/or the area managed by the kernel of the core 11*b*. In this case, the kernel managing area and the area of the memory block device must not be overlapped to each other. It should be noted that in general, io_remap function can not map a lower address than the top address of the kernel managing area (it results in an error to protect the kernel managing area), and therefore, in this case, io_remap function is modified to enable the modified io_remap function to map a lower address than the top address of the kernel managing area. FIG. 7 shows a diagram which indicates another example of memory areas allocated in the DRAM 3 in Embodiment 2. As shown in FIG. 7, for example, the memory block device can be allocated in a lower address than the kernel managing area of the core 11*b*.

Furthermore, in Embodiments 1 and 2, the kernel of the core 11*a* may generate a RAM disk in the kernel managing area of the core 11*a*, load the panel program to the RAM disk, and mount the RAM disk instead of the panel program area included in the flash memory 2. Similarly, the kernel of the core 11*b* may generate a RAM disk in the kernel managing area of the core 11*a*, load the main program to the RAM disk, and mount the RAM disk instead of the main program area included in the flash memory 2.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
a first processing unit;
a second processing unit configured to perform a process different from a process performed by the first processing unit; and
a non volatile memory device in which a shared root file system has been stored, the shared root file system mounted by a kernel for the first processing unit and a kernel for the second processing unit.

2. The image forming apparatus according to claim 1, wherein:
the shared root file system does not include any data and/or any programs to be rewritten by the first processing unit and the second processing unit.

3. The image forming apparatus according to claim 2, wherein:
the non volatile memory device comprises a first memory area in which data and/or a program to be rewritten by the first processing unit have been stored, and a second memory area in which data and/or a program to be rewritten by the second processing unit have been stored;

the first memory area is configured to be mounted by the kernel of the first processing unit; and the second memory area is configured to be mounted by the kernel of the second processing unit.

4. The image forming apparatus according to claim 1, wherein:

the second processing unit is further configured to perform a job management process; and the first processing unit is further configured to perform a predetermined process other than the job management process.

5. The image forming apparatus according to claim 4, further comprising:

an operation panel; and wherein the first processing unit is further configured to perform a process to control the operation panel.

6. The image forming apparatus according to claim 4, further comprising:

a network interface; and wherein the first processing unit is further configured to perform a process of data communication using the network interface.

7. The image forming apparatus according to claim 1, wherein:

the non volatile memory device in which the kernels of the first processing unit and the second processing unit have been stored; and one of the first processing unit and the second processing unit is further configured to perform a boot loader to start both the kernel of the first processing unit and the kernel of the second processing unit.

8. The image forming apparatus according to claim 1, further comprising:

a volatile memory; and wherein the first processing unit is further configured to load the shared root file system to the volatile memory and to mount the shared root file system loaded to the volatile memory; and the second processing unit is further configured to mount the shared root file system loaded by the first processing unit to the volatile memory.

9. The image forming apparatus according to claim 8, wherein:

the shared root file system is further configured to be loaded to an outside area of areas managed by the kernel of the first processing unit and the kernel of the second processing unit in the volatile memory.

10. The image forming apparatus according to claim 9, wherein:

one of the first processing unit and the second processing unit is configured to load the shared root file system to an outside area of areas managed by the kernel of the first processing unit and the kernel of the second processing unit in the volatile memory, and to start the kernel of the first processing unit and the kernel of the second processing unit after loading the shared root file system.

11. The image forming apparatus according to claim 9, wherein:

the first processing unit and the second processing unit are further configured to manage a memory area where the shared root file system was loaded as a memory block device.

12. The image forming apparatus according to claim 11, wherein:

one of the first processing unit and the second processing unit is configured to load the shared root file system to an outside area of areas managed by the kernel of the first processing unit and the kernel of the second processing unit in the volatile memory using a boot loader, and to start the kernel of the first processing unit and the kernel of the second processing unit after loading the shared root file system.

13. The image forming apparatus according to claim 12, wherein:

the memory block device of the shared root file system is configured to be enabled to be in an address area after the area managed by the kernel of the first processing unit and/or the area managed by the kernel of the second processing unit.

14. The image forming apparatus according to claim 11, wherein:

the memory block device of the shared root file system is configured to be enabled to be in an address area after the area managed by the kernel of the first processing unit and/or the area managed by the kernel of the second processing unit.

15. The image forming apparatus according to claim 11, wherein:

the memory block device is an MTD device.

16. The image forming apparatus according to claim 1, wherein:

a program in the shared root file system is described to acquire an ID of a processing unit that is executing this program, and to perform a process corresponding to the acquired ID.

17. The image forming apparatus according to claim 1, further comprising:

a multiple core processor; and wherein the first processing unit and the second processing unit are any two of plural cores in the multiple core processor.

18. The image forming apparatus according to claim 1, wherein:

the non volatile memory device is a flash memory.

* * * * *